United States Patent [19]
Schwartz

[11] Patent Number: 5,951,297
[45] Date of Patent: Sep. 14, 1999

[54] SYSTEM AND METHOD FOR TEACHING READING SKILLS USING A WAGERING GAME USING CHIPS, A TIMER, AND CARDS BEARING ALPHABET LEARNING INDICIA

[75] Inventor: Daniel Paul Schwartz, San Mateo, Calif.

[73] Assignee: Madge Pik-Ching Wong, Fremont, Calif.

[21] Appl. No.: 09/008,107

[22] Filed: Jan. 16, 1998

[51] Int. Cl.[6] .............................. G09B 1/00; G09B 1/16; G09B 17/00
[52] U.S. Cl. .......................... 434/167; 434/172; 434/178
[58] Field of Search .................................... 434/172, 178, 434/167

[56] References Cited

U.S. PATENT DOCUMENTS

| | | | |
|---|---|---|---|
| D. 151,758 | 11/1948 | Hart | D21/390 |
| 1,584,627 | 5/1926 | Marino | 434/159 |
| 2,265,334 | 12/1941 | Armbruster | 273/299 |
| 4,262,431 | 4/1981 | Darnell | 434/170 |
| 4,671,516 | 6/1987 | Lizzola et al. | 273/299 |
| 5,277,586 | 1/1994 | Branch | 434/184 |
| 5,409,237 | 4/1995 | Marcley et al. | 273/299 |
| 5,480,157 | 1/1996 | Plummer | 273/432 |
| 5,556,102 | 9/1996 | Huang | 273/299 |

*Primary Examiner*—Jessica J. Harrison
*Assistant Examiner*—David A Fleming
*Attorney, Agent, or Firm*—Pennie & Edmonds, LLP

[57] ABSTRACT

A game for teaching reading skills through phonics and decoding skills. The game provides for increasing student (player) interest by incorporating a wagering system similar to that of casino Blackjack. The wagering aspect makes the game attractive to mature students (players) who are learning to read or are improving their reading skills. The game uses word cards and sentence cards. The word cards have specially-selected words to emphasize important vowel sounds, common two letter combinations (consonant—consonant and consonant-vowel) and are selected to use words falling into categories selected for their universal association. The sentence cards are a logical progression from the philosophy of Universal Associative Learning, and pose questions or assign tasks to emphasize reading comprehension and critical thinking skills. The game also uses timing means which sets a period of time in which the card must be correctly responded to, and also uses chips for the placing of wagers. When there is more than one student reader playing against the banker, the student readers may compete to be the first to correctly respond to a single common card, or may independently attempt to respond to their individual cards.

17 Claims, 3 Drawing Sheets

SYSTEM AND METHOD FOR TEACHING READING SKILLS USING A WAGERING GAME USING CHIPS, A TIMER, AND CARDS BEARING ALPHABET LEARNING INDICIA

BACKGROUND OF THE INVENTION

1. Field of the Invention

The invention relates to aids for teaching reading skills, more particularly games that teach reading through phonics and decoding skills.

2. Background Art

It is known in the art to use games to teach reading skills. For example, U.S. Pat. No. 5,277,586 to Branch ("Branch") provides cards bearing single letters and short letter combinations, to help teach children with reading and speaking dysfunctions to improve their reading and speaking skills. The cards are to be used in therapy sessions, but are intended to provide a game format to stimulate the children's interest.

U.S. Pat. No. 4,661,074 to Walker ("Walker") discloses a teaching device primarily for dyslexics, utilizing cards. The cards are provided with phonograms, words, and cards provided with a letter, a word beginning with that letter, and a picture corresponding to that word. The cards are used in conjunction with a game board which incorporates spinning indicators which are used to randomly select cards. The players receive the associated point values by reading the word on the card correctly. The first person to amass a certain number of points wins the game.

U.S. Pat. No. 5,524,899 to Haqedorn ("Haqedorn") discloses an alphabet-learning card game using a deck of cards, each of which is provided with a single letter of the alphabet, in both upper and lower case, along with a picture of an object beginning with that letter. The cards are used to learn to identify alphabet letters and to construct words.

Although these games make use of alphabet and phonics cards, the game rules are typically very simple, as would appeal to young children. For example, Branch uses the alphabet cards in a manner similar to an extremely simplified form of Scrabble®, while Haqedorn uses the cards in a game similar to the traditional children's game "Go Fish." Such simple games are not suitable for stimulating interest from more mature student readers, such as adults learning English as a second language, young adults who do not read well, and illiterate adults.

It is also known to provide word-based games for primarily recreational purposes such as the well-known parlor games Boggle® and Scrabble®. However, the rules and difficulty of play of these games makes them unsuitable for student readers, even when competing with other student readers. Similarly, U.S. Pat. No. 5,213,333 to Petrovich et al. ("Petrovich") discloses a word-association board game. Players create lists of phrases, each phrase containing one word in common with the preceding phrase. Points are scored according to the number of phrases the player can think of in a given time. Petrovich is a primarily recreational game, and is specifically directed to developing "free association" rather than reading or comprehension skills.

Therefore, there is a need in the art for a game to teach reading skills which uses a rule format which is attractive to, and non-stigmatizing for, mature student readers, such as a card game wagering format.

There is further a need in the art for a game which can be played enjoyably by beginning student readers but still provides for intensive development of reading and comprehension skills.

Furthermore, there is a need in the art for a game to teach reading skills which provides for reading comprehension skills in addition to simple identification of alphabet letters and the reading of single words.

Therefore, there is a need for a card game which combines a wagering methodology in conjunction with a teaching game designed to teach student readers, of all ages, reading and comprehension skills through the use of word and sentence cards by developing decoding skills.

SUMMARY OF THE INVENTION

Accordingly, one object of the invention is to provide a card game for teaching reading skills using a timer, wagering chips, and a plurality of playing cards. The cards comprise word cards provided with single words, and sentence cards, provided with sentences posing questions or assigning tasks. The timer, chips and cards are to be used by student readers according to a predetermined plan of instructive game play based on the rules of Blackjack.

In accordance with a preferred embodiment of the invention, the words on the word cards are selected to teach important elements of English language, such as basic long and short vowel sounds and two letter consonant and vowel combinations. The words fall into categories of related concepts (such as family relationships, articles of clothing, sports, and transportation) which are selected for their universal association and appeal to student readers.

In accordance with one aspect of the invention, the method of playing the card game for teaching reading skills to a student reader employs a timer, wagering chips, and a plurality of playing cards imprinted with special alphabet learning indicia. The game play comprises the following steps: (a) a person is selected to act as the Banker; (b) the Banker provides a starting stake of wagering chips to the student reader; (c) the student reader places a wager; (d) the Banker selects and exposes a playing card from the playing card deck and starts the timer; (e) the student reader attempts to correctly respond to the playing card before the timer runs out; (f) the Banker processes the wager; and (g) repeating steps (c) through (f) until the Banker or the student reader runs out of wagering chips.

In accordance with another aspect of the invention, improved teaching of reading skills may be achieved by allowing the Banker to give the student reader the option to obtain help from the Banker in responding to card. In this case, the wager is a "push", and processing of the wager simply involves return of the wager amount to the student reader.

In accordance with yet another aspect of the invention, more than one student reader can participate in the game at one time in a competitive fashion. The game equipment is the same as for the single-reader game, however the method of play is different, comprising the following steps: (a) a person is selected to act as the Banker; (b) the Banker provides a starting stake of wagering chips to each of the student readers; (c) each of the student readers places a wager; (d) the Banker selects and exposes a single playing card common to all the student readers from the card deck and starts the timer (e) the student readers competitively attempt to be the first to correctly respond to the common card before the timer runs out; (f) the Banker processes the wagers; and (g) steps (c) through (f) are repeated until the Banker or all of the student readers run out of wagering chips.

In accordance with still another aspect of the invention, more than one student reader can participate in the game at one time in an independent fashion. The game equipment is the same as for the single-reader game, however the method of play is different, comprising the following steps: (a) a person is selected to act as the Banker; (b) the Banker provides a starting stake of wagering chips to each of the student readers; (c) each of the student readers places a wager; (d) the Banker selects and exposes a separate independent playing card for each of the student readers from the card deck; (e) the Banker starts the timer; (f) the student reader attempts to correctly respond to his independent playing card before the timer runs out; (g) the Banker processes the wager; (h) steps (e) through (g) are repeated for each of the student readers; and (i) steps (c) through (h) are repeated until the Banker or all of the student readers run out of wagering chips.

Word cards make use of basic phonetic combinations to teach reading through the development of phonics decoding skills; however, wagering imbues Power Reader with a level of excitement matched only by other wagering games found in casinos around the world. Power Reader uses the excitement of wagering and risk taking as a catalyst for learning to read.

The philosophy behind this teaching methodology is to create the excitement of a "Learning Casino." Winning chips gives the student reader a tangible sign of success and channels the adrenaline of a game of wagering and risk into a catalyst for learning. The ability to ask for "help" at the end of the allotted time period, with the allure of future attempts at winning, takes the sting out of review.

This methodology is ideal for student readers of all ages, for it is neither boring nor patronizing. Younger readers will especially take pleasure in the motor skill tasks accompanying the sentence cards, thereby adding to their enjoyment of what would otherwise be a merely cerebral task. Older student readers will not be ashamed to play, as the wagering aspect of the game will counteract any stigma associated with a "kid's game." Power Reader can be enjoyed by parents and children and creates an environment that stimulates learning and family activity. This teaching methodology advantageously reinforces the association of reading with winning.

The concept of the Learning Casino can be applied to any subject that requires reading and review. English, history, the fine arts, geography foreign language, theology, philosophy, civics, and the sciences can be incorporated into the format of the game. Parents and educators should be encouraged to create their own cards, following the principles set forth below, to meet the specific needs of their own students. The game reinforces reading decoding skills, critical thinking, and motor activity, all in an enjoyable environment.

The foregoing and still other objects of this invention will become fully apparent to those of skill in this art from the description set forth hereinafter when considered in conjunction with the accompanying drawings.

DETAILED DESCRIPTION OF THE PREFERRED EMBODIMENT

Game Equipment

Figure 1:
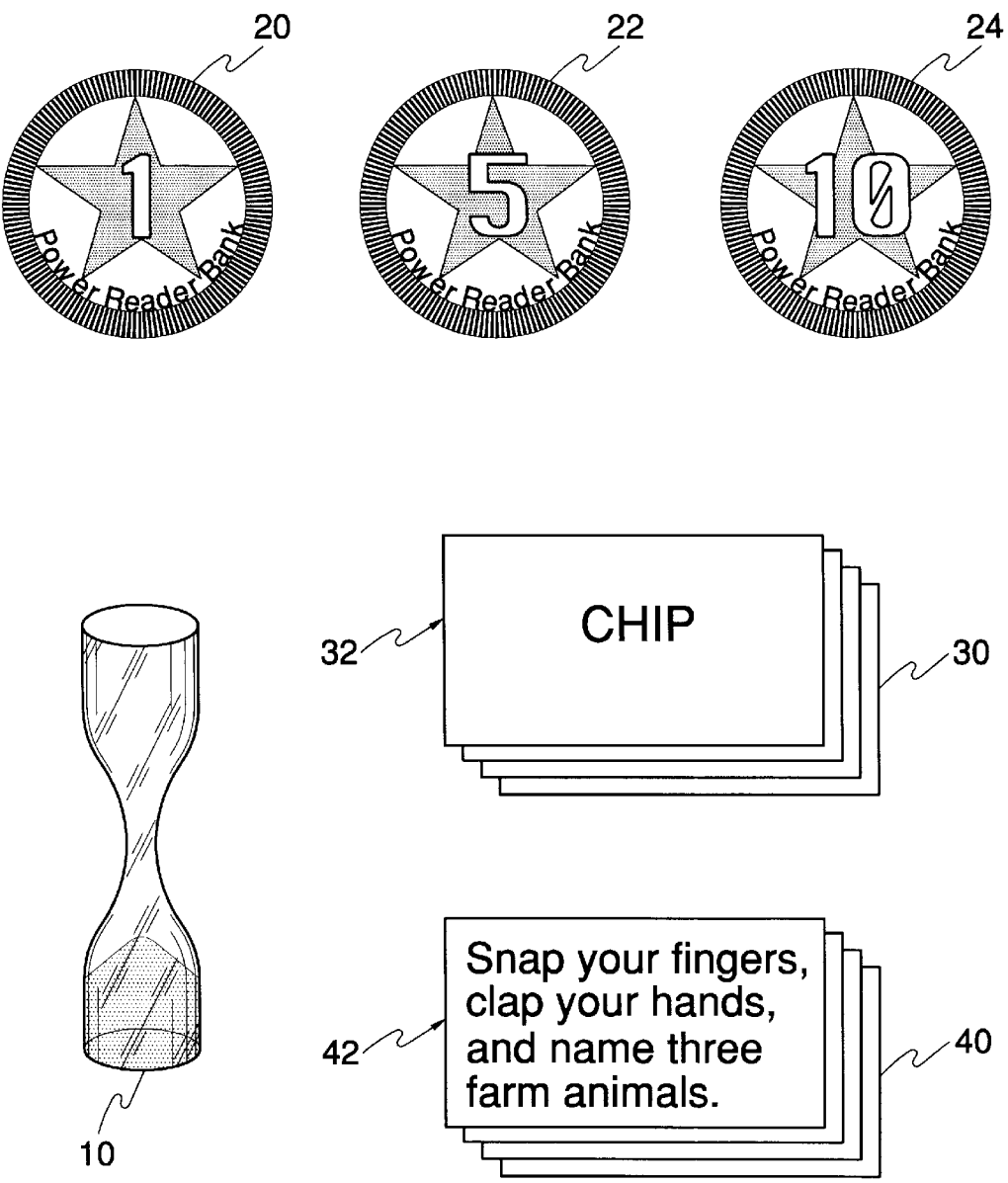
FIG. 1 is a perspective view of the game equipment in accordance with a preferred embodiment of the present invention.

FIG. 1 illustrates a timer 10, wagering chips 20, 22, and 24 of various denominations, and representative sets of playing cards 30 and 40 which may be employed to play a Blackjack-type game teaching reading skills according to the present invention. Insofar as the present invention involves a game in which the players are learning how to read, the terms "player," "student," and "student reader" are used interchangeably herein.

The timer 10 limits the duration of each turn, and is so designed or selected so as to give the players a reasonable amount of time to respond to the cards. For example, a value of 15 seconds may be appropriate. Although the illustrated embodiment is a sand timer, it is clear to one of skill in the art that other known timers could be used, such as mechanical ("wind-up") timers or digital electronic timers, giving the Banker the ability to select the time given to the player for his response.

The chips 20, 22, and 24, are used for the wagering aspect of the reading game of the present invention. The chips can be denominated in units of dollars or other appropriate units, such as the "stars" illustrated in FIG. 1.

The word card set 30 emphasizes basic phonetic combinations of vowel and consonant sounds. For example, word card 32 is imprinted with the word "CHIP," illustrating the "CH" consonant combination as well as the "short I" vowel sound. The sentence card set 40 exercises basic knowledge of topical subjects and also involves motor skill tasks for the amusement of the player. For example, sentence card 42 instructs the player to "Snap your fingers, clap your hands, and name three farm animals."

In a preferred embodiment of the present invention, various word lists have been found to be particularly efficacious in teaching reading.

Basic long and short vowel sounds are taught through the use of simple word cards to build confidence in decoding skills. Vowels are essential building blocks to the English language. They can be taught by introducing short (three to six letter) words. These words can also be drawn from younger readers' school spelling lists.

For example, the following list has been found to be useful in teaching words with vowel sounds:

| A | E | I | O | U | OO | EE |
|---|---|---|---|---|----|----|
| BAT | BET | IN | COT | BUT | BOOT | BEET |
| CAT | GET | PIN | DOT | CUT | HOOT | FEET |
| HAT | LET | SIN | HOT | GUT | LOOT | MEET |
| MAT | MET | WIN | LOT | NUT | MOON | DEEP |
| RAT | NET |    | NOT | RUT | NOON | KEEP |
| SAT | PET |    | POT |    | DROOL | SLEEP |
| BAD | SET |    | ROT |    | FOOL |    |
| LAD | VET |    |    |    | SCHOOL |    |
| MAD | WET |    |    |    | ZOO |    |
| SAD |    |    |    |    |    |    |

Two letter consonant and vowel combinations form the building blocks of many vocabulary words in the English language. The consonant blends "CH", "SH", "GR", and "TH" are frequently used. The "OW" and "OU" (ow sound), the "OO" (oo sound), and the "EE" (ee sound) are also common blends. The game of the present invention helps the student reader recognize these letter sound combinations and learn to apply them to applicable vocabulary words. The student reader's decoding skills are thereby enhanced.

For example, the following list has been found to be useful in teaching two-letter combinations commonly encountered in the English language:

| CH | SH | GR | OW | TH |
|---|---|---|---|---|
| CHANGE | SHIN | GRASS | COW | THE |
| CHEAT | SHIP | GREEN | HOW | THAT |
| CHEEK | SHINE | GRIN | NOW | THEM |
| CHEESE | SHOOT | GRIP | VOW | THEN |
| CHEW | SHOP | GROSS | WOW | THEY |
| CHILD | SHOT | GROW | | THIS |
| CHIME | SHOUT | GROWL | | THANK |
| CHINA | SHUT | | | |
| CHINESE | | | | |
| CHIP | | | | |
| CHOOSE | | | | |
| CHOP | | | | |
| CHURCH | | | | |

Word card categories are created to appeal to student readers of all ages and students learning English as a second language (ESL Students). Thus words like Mother and Father are used for their universal association. Articles of clothing (Pants) and animals (Cat) are used because they are part of common experience and have an easy visual association. The same rationale applies to word categories like sports (Baseball) and transportation (Car). These words have universal appeal and are easily visualized by student readers regardless of age, background, or ability.

The following list has been found to be useful in teaching words in groups of commonly-encountered related concepts:

| CLOTHES | ANIMALS | FAMILY |
|---|---|---|
| PANTS | CAT | MOTHER |
| SHIRT | COW | FATHER |
| SHOES | DOG | SISTER |
| SOCKS | PIG | BROTHER |
| TIE | RAT | AUNT |
| CAP | HORSE | UNCLE |
| UNDERWEAR | MOUSE | COUSIN |
| JACKET | CHICKEN | |
| SUIT | BULL | |
| VEST | GOAT | |
| BOWTIE | DUCK | |
| | GOOSE | |
| | LION | |
| | TIGER | |
| | BEAR | |
| | MONKEY | |
| | DOVE | |
| | EAGLE | |
| | HAWK | |
| | DEER | |
| | RACCOON | |
| | SKUNK | |
| | ELEPHANT | |
| | HIPPO | |
| | RHINOCEROS | |

The following list has also been found to be useful in teaching words in groups of commonly-encountered related concepts:

| SPORTS | TRANSPORTATION |
|---|---|
| BASEBALL | CAR |
| FOOTBALL | PLANE |
| BASKETBALL | TRAIN |
| SOCCER | SHIP |
| HOCKEY | BICYCLE |
| TENNIS | MOTORCYCLE |
| BOXING | SCOOTER |
| VOLLEYBALL | SKATEBOARD |

Sentence cards are a logical progression of the philosophy of Universal Associative Learning. Some of the topical subjects covered are colors, animals, forms of transportation, articles of clothing, family association, weather, and simple geography. Words beginning with a certain letter, sound or blend are reinforced by questions like, "NAME THREE WORDS STARTING WITH CH". Rhyming patterns are also stressed by sentence cards such as, "NAME FIVE WORDS THAT RHYME WITH CHIN." Review can be incorporated into the game by selecting rhyming words which were learned from the word cards (e.g., "PIN", "SIN", "WIN", "GRIN", and "SHIN"). Indeed, it can be appreciated that the sentence cards generally are created, at least in part, to reinforce the words learned from the word cards.

Critical thinking skills are also reinforced by sentence cards that require tasks such as: "NAME THREE JOBS THAT MAKE USE OF MATH". "NAME SOMETHING YOU WEAR WHEN IT IS COLD". Tasks or questions that help the student use intellect and association to extrapolate and interpret concepts are essential to the learning process.

Opinion questions such as, "NAME A BOOK THAT MADE YOU THINK DEEPLY" also help the student reader develop critical thinking skills that would be applicable to future writing assignments in school. There is no definitive right or wrong answer here; the key is that the student is encouraged to think deeply and be prepared to justify his answer in discussion. This is especially helpful for ESL students. The questions can thus be used as a catalyst for future writing and conversation-based curriculum.

Motor skills are also incorporated in the sentence cards to make the game more entertaining and enjoyable, especially for younger players. Kinetic activity coupled with reading will increase attentiveness among younger students, thereby enhancing the educational effectiveness of the game. Sentence cards like, "CLAP YOUR HANDS, STAMP YOUR FEET, AND NAME THREE FAMOUS WOMEN" incorporate motor activities with topical subjects that anyone can relate to and enjoy. Younger students no longer have to sit still in order to learn. Students also begin to recognize the relationship between written commands and tangible tasks. This is extremely important for future school and work related skills.

The following illustrative sentence card set has been developed to advantageously teach reading skills according to the principles discussed above:

Blink your eyes.
Lift your feet.
Raise your hand.
Clap your hands.
Shake your head.
Stick out your tongue.
Roll your eyes.
Point to your ears.
Tell a joke.
Stand up and sit down.
Do three push-ups.
Count to six.
Meow like a cat.
Snap your fingers.

Pull on your ear.
Name your favorite dinosaur.
Name three kinds of dogs.
Name three kinds of flowers.
Name your favorite day of the week.
Name something that happens after it rains.
Turn in a circle three times.
Knock on wood.
Name your favorite month.
Say your teacher's name.
Name your least favorite food.
Stand on one leg and clap your hands.
Say your name.
Spell your name backwards.
Name three planets.
Name your planet.
Name three countries.
Name three kinds of transportation.
Name three states.
Name a movie that made you laugh.
Name seven colors.
Name five instruments.
Name three holidays.
Name an animal that is fun to ride but not to eat.
Name six farm animals.
Blink your eyes, clap your hands, and sing the first verse of a song.
Name three jobs that make use of math.
Whistle a tune, snap your fingers, and name three books that you have enjoyed.
Name something that you wear on your feet.
Name something you wear when it is hot.
Name something you wear when it is cold.
Name three boy's names that start with "M".
Name six girl's names.
Name something you carry when it rains.
Name three religions.
Name five small animals.
Name four sports that people play.
Name something that you wear on your head.
Name three famous people.
Name five large animals.
Name four common pets.
Name the color of your hair.
Name your favorite animal.
Name your favorite television show.
Name your favorite holiday.
Name your favorite thing to do for fun.
Clap your hands very quickly.
Snap your fingers five times.
Put your hands over your head.
Wave your hands in the air.
Name your favorite hobby.
Describe someone you like.
Roar like a lion.
Hop on one foot three times.
Do six jumping-jacks.
Name the color of the family car.
Name an animal that is strong.
Name an animal that is very beautiful but very dangerous.
Name the five senses.
Name the color of your eyes.
Say what number comes after fourteen.
Name an animal that lives in the sea but breathes air.
Name something that tastes salty.
What does your father do for a living?.
Name three machines you use every day.
Name an animal that is big but very friendly.
Make an animal that is really small and very shy.
Name three jobs you would like to have.
Name an animal that is black and white.
Name something that tastes sweet.
Name a book that made you think deeply.
Name a food that you can cook.
Name an animal that you would like to be for one day.
Name an animal that has no teeth.
Name an animal that can see very well in the dark.
Name an animal that lives in the sea but is a mammal.
Name an animal that is little but very dangerous.
Blink your eyes six times.
Name a plant that is pretty to look at but dangerous to touch.
Name an animal that lives in the trees.
Name the first lady.
Say the name of your city.
Name three sea creatures.
Name three kinds of trees.
Name three kinds of cookies.
Name the nearest ocean.
Say the name of your state.
Sing the first verse of a song.
Spell your sister's name.
Say your father's first name.
Name four colors.
Name your favorite movie.
Name your favorite food.
Count to one hundred by 10's.
Name your favorite sport.
Count to one hundred by 5's.
Name the President of the United States.
Name your favorite restaurant.
Whistle a tune.
Say the name of your country.
Say six words that start with "W".
Say six words that start with "P".
Say six words that end with "ING".
Say six words that start with "S".
Name your city and stamp your feet.
Name three words that rhyme with "SIT".
Name three words that rhyme with "NOT".
Say six words that start with "R".
Name your country and snap your fingers.
Name three words that rhyme with "BAT".
Name three words that rhyme with "BET".
Name three words that rhyme with "CUT".
Name your state and clap your hands.
Name a country that starts with "C".
Name an animal that can walk on two legs.
Name an animal that may be as smart as human beings.
Name an animal that can fly but is not a bird.
Name an animal that is a bird but cannot fly.
Name five desserts.
Name a flower whose seeds you can eat.
Name a country that starts with "R".
Name a country that starts with "S".
Name three tools that are used for cutting.
Name the colors of the American flag.
Name a food that we eat on Thanksgiving.
Raise your hands in the air and name your planet.
Snap your fingers, stick out your tongue, and name three animals that eat meat.
Blink your eyes, touch your nose, and name your state.
Name a food that you must cook before you can eat it.
Name a food that you can eat raw.
Name a country that starts with "U".

Name the force that holds us to the Earth.
Name four things you write with.
Turn in a circle and whistle.
Name three kinds of birds.
Name six cartoon characters.
Spell your favorite color.
Name three kinds of cars.
Name six words that start with "R".
Name six words that start with "S".
Name three words that start with "T".
Touch your nose.
Flap your arms like they are wings.
Name three famous actors.
Name three kinds of trucks.
Name your favorite dessert.
Name six countries of the world.
Name five things that can help us see more clearly.
Name three professions that help people.
Name six cities of the world.
Name two oceans, three states, and two countries.
Name five words that rhyme with "CHIN".
Name an animal that has been domesticated for thousands of years.
Name four cities in the state of California.
Name six words that start with "CH".
Name six dishes that use pasta.
Name four things that give off light.
Name an animal that is very smart, very big, but would not make a good pet.
Snap your fingers, blink your eyes, and name three languages other than English.
Name three insects that are yellow and black.
Name four tropical fruits.
Name three types of transportation that do not use engines.
Name a tree whose seeds can be as big as your head.
Name three types of energy that are used by industry.
Name six states in the United States of America.
Name three machines that help us communicate.
Name two oceans, three rivers, two lakes, and one sea.
Name a book that you felt taught you an important lesson.
Name three categories of music.
Name the class at school that you feel is the most important class of your day.
Name three kinds of animals that hunt in groups.
Clap your hands, stamp your feet, and name three famous women.

By using the cards above, or cards created according to the principles discussed above, student readers will learn to identify basic vowel sounds, common letter combinations, words corresponding to commonly encountered objects and experiences, and will develop reading comprehension and critical thinking skills.

Game Play

The rules of the game are based on the rules of the tradional wagering game of Blackjack, and provide a predetermined plan of instructive game play which is both interesting and educational. Although described herein as a reading game which incorporates the rules of Blackjack, the present invention may also be understood as a modification to the traditional game of Blackjack, by the addition of a timer and the use of reading cards.

Figure 2:
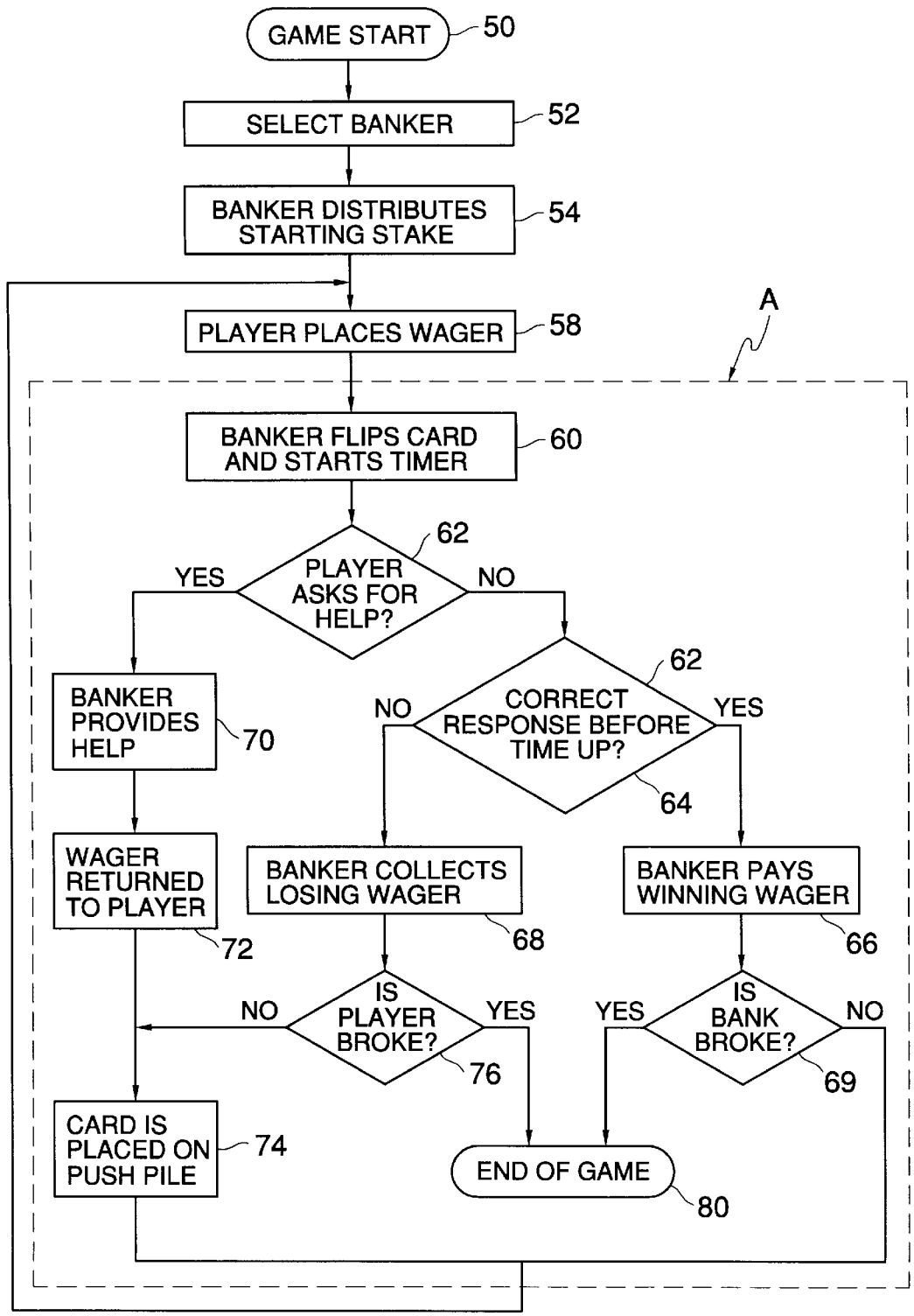
FIG. 2 is a flow chart of single-player game play in accordance with a preferred embodiment of the present invention.

The game play will be described by reference to FIGS. 2 and 3. As shown in FIG. 2, the game begins with the selection of the Banker, who must know how to read (block 52). The Banker will function in the role of the dealer, or the "house," controlling all aspects of the game and paying off and collecting wagers. The Banker then distributes the starting stake of chips to each of the participating players (block 54). For example, each player may be given a starting stake of 30 stars worth of chips. As will be evident from the description of single-player play below, there may be only one player or there may be multiple players.

FIG. 2 illustrates single-player play. The hand begins by the player placing a wager (block 58). The Banker will flip the selected word/sentence card and start the timer (block 60). The card can be selected randomly (i.e., the top card of a shuffled deck), or may be chosen by the Banker based upon the player's abilities and the desired learning objectives. The student reader has the duration of the timer period to read the card correctly; more than one attempt is admissible as long as time remains.

If the student reader correctly responds to the card ("Yes" response to block 64), the Banker pays the amount wagered (block 66). In the case of word cards, the required response is simply to read the card; for sentence cards, the task or question must be completed/answered as well.

If the student wants "help" ("Yes" response to block 62), the Banker helps the student sound out the word or words on the card (block 70). This results in a "push": the wager is neither won nor lost, but is simply returned to the player (block 72). The card is placed aside in the "push pile" (block 74) for subsequent attempts or review after the game.

If the student has not responded correctly to the card by the end of the allotted period ("No" response to block 64), the wager is lost (block 68) and the card is placed on the push pile (block 74).

Optionally, the Banker can offer a "side bet" to review old cards from the push pile. These bets are left to the Banker's discretion and can involve 1—1 payoffs or higher. Any number of cards from the push pile can be part of the wager. For example, the Banker may challenge the student reader to read the entire push pile correctly, within the duration of the sand timer, for a payoff of 3-1. In this way, the student reader is encouraged to review troublesome words and enjoy the process at the same time. Troublesome cards can be returned, without restriction, to the push pile for additional review.

The game continues as long as desired or until the occurrence of a terminating event such as when player runs out of chips ("Yes" response to block 76) or the Bank runs out of chips ("Yes" response to block 69). The game can easily be restarted by giving players their original allotment of chips, or by returning a portion of the chips to the bank.

A given player who is learning to read English alphabet will typically begin with the word cards 30. As that player improves, he can then progress to the sentence cards 40 which make use of sentences that ask simple questions of a topical nature and also utilize basic motor skill tasks. The Banker, in his role as dealer of the cards, can control the distribution of cards to appropriately challenge the student reader.

Figure 3:
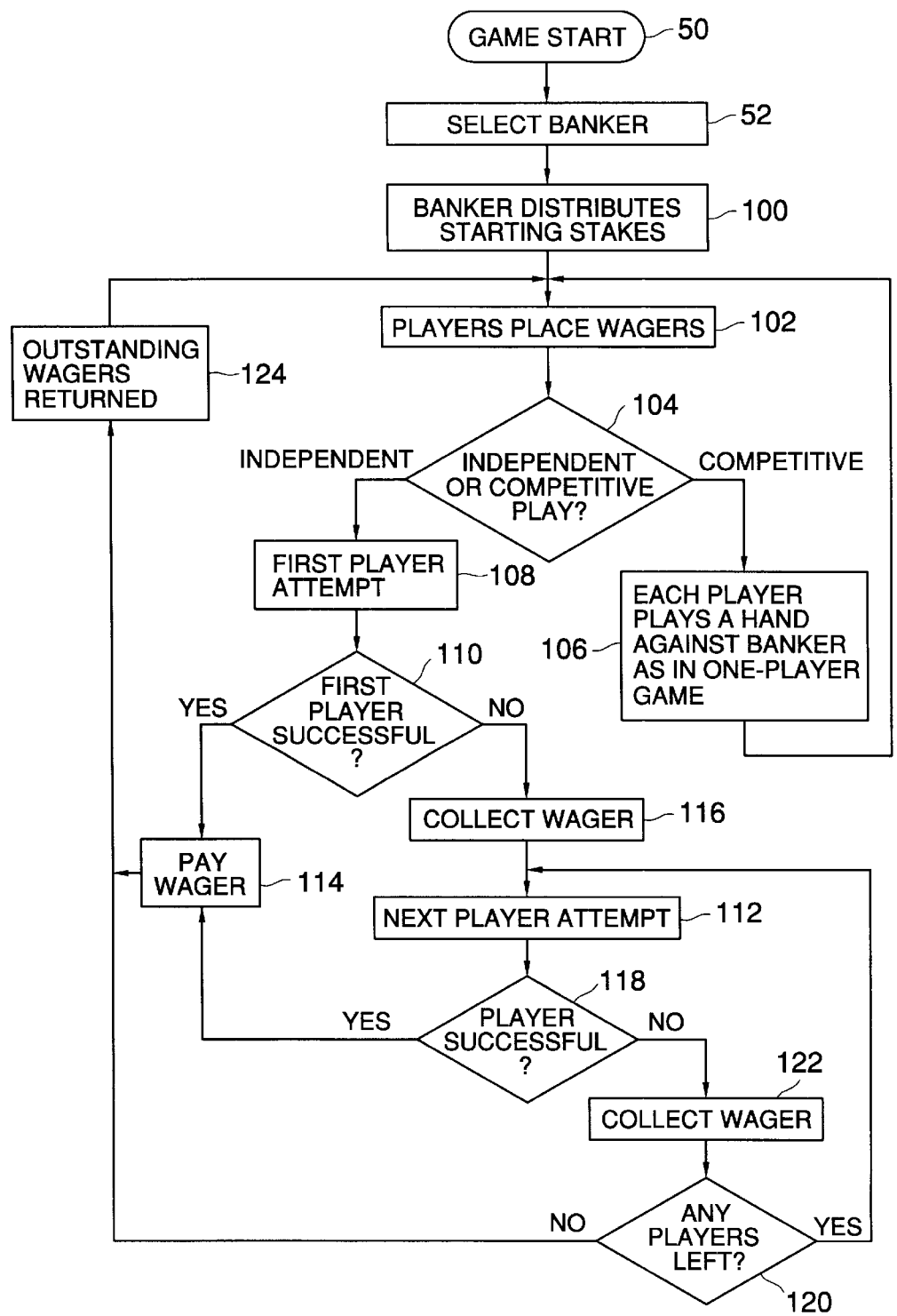
FIG. 3 is a flow chart of multiple-player game play in accordance with a preferred embodiment of the present invention.

FIG. 3 illustrates multiple-player play. After the Banker is selected, just as in single-player play (block 52), he distributes starting stakes to each of the players (block 100). The players place their wagers, and may choose to wager different amounts based on their confidence and aggressiveness (block 102). Players can play against each other by competing to respond correctly to the same ("common") card ("competitive play"), or, individually against the Banker, each player having his own card ("independent play"). The selection (decision block 104) is made before the Banker deals the cards. In either case, only the Banker pays the winner(s) and collects from the loser(s) at the end of the hand.

In independent play, the game between the Banker and each individual player proceeds as for the single-player game, following the steps contained within Box A in FIG. 2 (block 106). One player's game does not affect another's, except that when multiple players play in parallel, they will get enjoyment from the competition to amass the most wagering chips.

In competitive play, the players take turns (for example, going in clockwise order around the table) attempting to correctly respond to the common card. The first player makes his attempt to correctly respond before the timer expires (block 108). If the first player is successful ("Yes" response to block 110), the Banker pays his wager (block 114) and a new hand is begun by a new betting round (block 102). If the first player is not successful ("No" response to block 110), the Banker collects his wager (block 116) and the next player makes his attempt (block 112). Subsequent players make their attempts until one succeeds ("Yes" response to block 118), at which point the Banker pays that player's wager (block 114) or the last player fails ("No" response to block 120), in which case a new hand is begun (block 102). Whenever a player successfully responds to the card, the players who did not get an opportunity to read the card simply have their bets returned to them (block 124).

The foregoing disclosure and discussion relate to preferred exemplary embodiments of the present invention. However it should be understood that other variants and embodiments thereof will become apparent to those skilled in the art upon a reading of the specification taken in conjunction with a study of attached drawings. For example, although the invention has been described with reference to the rules for the traditional game of Blackjack, it will be evident to one of skill in the art that the rules of other variations of the game of Blackjack, as known in the recreational and commercial casino gaming fields may be substituted, without departing from the intent of the present invention. Furthermore, it should be understood that a myriad of such modifications and alternative embodiments are possible without departing from the basic intent or scope of the present invention.

What is claimed is:

1. A card game for teaching reading skills including a timer, wagering chips and a plurality of playing cards bearing special alphabet learning indicia, useable by student readers pursuant to a predetermined plan of instructive game play, said plurality of playing cards comprising a set of word cards bearing single words and a set of sentence cards bearing sentences posing questions or assigning tasks, wherein said word cards comprise a plurality of sets of cards, according to the following: a vowel sounds set, a two-letter combination set, and one or more of related concepts sets, each of said related concepts sets comprising a set of cards bearing words which are associated with a single concept.

2. The card game for teaching reading skills according to claim 1, wherein the cards in said vowel sounds set comprise cards bearing short words containing basic long and short vowel sounds.

3. The card game for teaching reading skills according to claim 1, wherein the cards in said vowel sounds set comprise cards bearing the following words containing basic long and short vowel sounds:

| BAT | BET | IN  | COT | BUT | BOOT | BEET |
|-----|-----|-----|-----|-----|------|------|
| CAT | GET | PIN | DOT | CUT | HOOT | FEET |

-continued

| HAT | LET | SIN | HOT | GUT | LOOT  | MEET  |
|-----|-----|-----|-----|-----|-------|-------|
| MAT | MET | WIN | LOT | NUT | MOON  | DEEP  |
| RAT | NET |     | NOT | RUT | NOON  | KEEP  |
| SAT | PET |     | POT |     | DROOL | SLEEP |
| BAD | SET |     | ROT |     | FOOL  |       |
| LAD | VET |     |     |     | SCHOOL|       |
| MAD | WET |     |     |     | ZOO   |       |
| SAD.|     |     |     |     |       |       |

4. The card game for teaching reading skills according to claim 1, wherein the cards in said two-letter combination set comprise cards bearing short words containing two-letter consonant and vowel combinations.

5. The card game for teaching reading skills according to claim 1, wherein the cards in said two-letter combination set comprise cards bearing short words containing the following two-letter consonant and vowel combinations: "CH", "SH", "GR", "TH", "OW", "OU", and "OO".

6. The card game for teaching reading skills according to claim 1, wherein the cards in said two-letter combination set comprise cards bearing the following short words containing two-letter consonant and vowel combinations:

| CHANGE  | SHIN  | GRASS | COW | THE   |
|---------|-------|-------|-----|-------|
| CHEAT   | SHIP  | GREEN | HOW | THAT  |
| CHEEK   | SHINE | GRIN  | NOW | THEM  |
| CHEESE  | SHOOT | GRIP  | VOW | THEN  |
| CHEW    | SHOP  | GROSS | WOW | THEY  |
| CHILD   | SHOT  | GROW  |     | THIS  |
| CHIME   | SHOUT | GROWL |     | THANK |
| CHINA   | SHUT  |       |     |       |
| CHINESE |       |       |     |       |
| CHIP    |       |       |     |       |
| CHOOSE  |       |       |     |       |
| CHOP    |       |       |     |       |
| CHURCH. |       |       |     |       |

7. The card game for teaching reading skills according to claim 1, wherein the cards in said related concepts set comprise cards bearing words falling into the following categories: family relationships, articles of clothing, animals, sports, and transportation.

8. The card game for teaching reading skills according to claim 1, wherein the cards in said related concepts set comprise cards bearing the following words falling into the categories of articles of clothing, animals, and family relationships:

| PANTS     | CAT     | MOTHER  |
|-----------|---------|---------|
| SHIRT     | COW     | FATHER  |
| SHOES     | DOG     | SISTER  |
| SOCKS     | PIG     | BROTHER |
| TIE       | RAT     | AUNT    |
| CAP       | HORSE   | UNCLE   |
| UNDERWEAR | MOUSE   | COUSIN  |
| JACKET    | CHICKEN |         |
| SUIT      | BULL    |         |
| VEST      | GOAT    |         |
| BOWTIE    | DUCK    |         |
|           | GOOSE   |         |
|           | LION    |         |
|           | TIGER   |         |
|           | BEAR    |         |
|           | MONKEY  |         |
|           | DOVE    |         |
|           | EAGLE   |         |
|           | HAWK    |         |
|           | DEER    |         |
|           | RACCOON |         |
|           | SKUNK   |         |

-continued

ELEPHANT
HIPPO
RHINOCEROS

9. The card game for teaching reading skills according to claim 1, wherein the cards in said related concepts set comprise cards bearing the following words falling into the categories of sports and transportation:

| BASEBALL | CAR |
| FOOTBALL | PLANE |
| BASKETBALL | TRAIN |
| SOCCER | SHIP |
| HOCKEY | BICYCLE |
| TENNIS | MOTORCYCLE |
| BOXING | SCOOTER |
| VOLLEYBALL | SKATEBOARD. |

10. A method of playing a card game for teaching reading skills to a student reader employing a timer, wagering chips and a plurality of playing cards bearing special alphabet learning indicia, wherein said word cards comprise a plurality of sets of cards, according to the following: a vowel sounds set, a two-letter combination set, and one or more of related concepts sets, each of said related concepts sets comprising a set of cards bearing words which are associated with a single concept, comprising the steps of:
 a. selecting a Banker;
 b. providing a starting stake of wagering chips to the student reader;
 c. placing of a wager by the student reader;
 d. selecting and exposing a playing card from among said plurality of playing cards, and starting said timer;
 e. attempting to correctly respond to said exposed playing card before the timer runs out, by the student reader;
 f. processing the wager; and
 g. repeating steps (c) through (f) as desired or until the occurrence of a terminating event.

11. The method of claim 10, wherein the processing step comprises paying the student reader his winnings if he correctly responded to said exposed playing card before said timer ran out or collecting the wager if the student reader did not correctly respond before said timer ran out.

12. The method of claim 10, further comprising, after step (d), the step of giving the student reader the option to obtain help from the Banker in responding to said exposed playing card, and wherein the processing step comprises returning the wager to the student reader.

13. A method of playing a card game for teaching reading skills to more than one student reader employing a timer, wagering chips and a plurality of playing cards bearing special alphabet learning indicia, wherein said word cards comprise a plurality of sets of cards, according to the following: a vowel sounds set, a two-letter combination set, and one or more of related concepts sets, each of said related concepts sets comprising a set of cards bearing words which are associated with a single concept, comprising the steps of:
 a. selecting a Banker;
 b. providing a starting stake of wagering chips to each of the student readers;
 c. placing of a wager by each of the student readers;
 d. selecting a playing card from among said plurality of playing cards and exposing it to the student readers;
 e. starting said timer;
 f. attempting to the correctly respond to the exposed playing card before the timer runs out, by a student reader;
 g. repeating steps (e) and (f) for each student reader until a student reader correctly responds to the exposed card before the timer runs out or all student readers have tried and failed to correctly respond to the exposed playing card before said timer runs out;
 h. processing of the wagers; and
 i. repeating steps (c) through (h) as desired or until the occurrence of a terminating event.

14. The method of claim 13, wherein the processing step comprises: paying a student reader his winnings if he correctly responded to the exposed playing card before said timer ran out; collecting a student reader's wager if he did not correctly respond before said timer ran out; and returning the student reader's wager if he did not get an opportunity to respond to the exposed playing card.

15. A method for playing a card game for teaching reading skills to more than one student reader employing a timer, wagering chips and a plurality of playing cards bearing special alphabet learning indicia, wherein said word cards comprise a plurality of sets of cards, according to the following: a vowel sounds set, a two-letter combination set, and one or more of related concepts sets, each of said related concepts sets comprising a set of cards bearing words which are associated with a single concept, comprising the steps of:
 a. selecting a Banker;
 b. providing a starting stake of wagering chips to each of the student readers;
 c. placing of a wager by each of the student readers;
 d. selecting and exposing a playing card from among said plurality of playing cards for each student reader;
 e. starting said timer;
 f. attempting to the correctly respond to the exposed playing card before the timer runs out, by a student reader;
 g. processing of the wager;
 h. repeating steps (e) through (g) for each of the student readers; and
 i. repeating steps (c) though (h) as desired or until the occurrence of a terminating event.

16. The method of claim 15, wherein the processing step comprises: paying the student reader his winnings if he correctly responded to the exposed playing card before said timer ran out or collecting the wager if the student reader did not correctly respond before said timer ran out.

17. The method of claim 15, further comprising, after step (f), the step of giving the student reader the option to obtain help from the Banker in responding to said exposed playing card, and wherein the processing step comprises returning the wager to the student reader.

* * * * *